US007799404B2

(12) United States Patent
Kitano et al.

(10) Patent No.: US 7,799,404 B2
(45) Date of Patent: Sep. 21, 2010

(54) PHOTO-CURABLE TRANSFER SHEET, LAMINATE, OPTICAL INFORMATION RECORDING SUBSTRATE, PROCESS FOR THE PREPARATION THEREOF, AND OPTICAL INFORMATION RECORDING MEDIUM

(75) Inventors: Hideki Kitano, Kodaira (JP); Hidefumi Kotsubo, Kodaira (JP); Takato Inamiya, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1320 days.

(21) Appl. No.: 10/491,607

(22) PCT Filed: Oct. 2, 2002

(86) PCT No.: PCT/JP02/10273

§ 371 (c)(1),
(2), (4) Date: Apr. 2, 2004

(87) PCT Pub. No.: WO03/032305

PCT Pub. Date: Apr. 17, 2003

(65) Prior Publication Data

US 2004/0257972 A1    Dec. 23, 2004

(30) Foreign Application Priority Data

Oct. 2, 2001   (JP) ............... 2001-305946
Oct. 2, 2001   (JP) ............... 2001-305947
Mar. 13, 2002  (JP) ............... 2002-68215

(51) Int. Cl.
*B32B 3/02* (2006.01)

(52) U.S. Cl. ............ 428/64.4; 428/64.9; 428/65.1; 428/65.2; 430/270.1; 369/275.1; 369/275.4; 369/264

(58) Field of Classification Search ........... 430/270.11, 430/270.1; 428/64.4, 64.9, 65.1, 65.2; 369/275.1, 369/275.4, 284, 264
See application file for complete search history.

(56) References Cited

U.S. PATENT DOCUMENTS

| 5,708,652 | A  | * | 1/1998 | Ohki et al.    | 369/275.1 |
| 5,770,348 | A  | * | 6/1998 | Kondo          | 430/321   |
| 5,878,018 | A  | * | 3/1999 | Moriya et al.  | 369/275.1 |
| 6,171,675 | B1 | * | 1/2001 | Iida           | 428/64.4  |

(Continued)

FOREIGN PATENT DOCUMENTS

JP    07-334866 A    12/1995

(Continued)

OTHER PUBLICATIONS

Supplemental European Search Report issued on Oct. 21, 2009 from the European Patent Office in the corresponding European application.

*Primary Examiner*—Betelhem Shewareged
(74) *Attorney, Agent, or Firm*—Sughrue Mion, PLLC

(57) ABSTRACT

A photo-curable transfer sheet having a photo-curable layer comprising a photo-curable composition, the photo-curable composition being deformable by application of pressure and containing a reactive polymer having a photopolymerizable functional group. The photo-curable transfer sheet preferably has a light transmittance of not less than 70% in a wavelength rang of 380 to 420 nm. An optical information recording substrate and medium prepared by the sheet. The sheet easily and precisely enables transfer of unevenness of the surface of a stamper by pressing.

22 Claims, 8 Drawing Sheets

U.S. PATENT DOCUMENTS

| | | | |
|---|---|---|---|
| 6,217,995 B1 * | 4/2001 | Handa ........................ | 428/220 |
| 6,270,611 B1 * | 8/2001 | Ohki et al. .................. | 156/220 |
| 6,337,118 B1 * | 1/2002 | Takehana et al. ........... | 428/64.1 |
| 6,434,107 B1 * | 8/2002 | Artigalas et al. ......... | 369/275.1 |
| 6,599,385 B1 * | 7/2003 | Liao et al. ................. | 156/272.2 |
| 6,663,935 B1 * | 12/2003 | Kashiwagi et al. ......... | 428/64.2 |
| 6,676,791 B1 * | 1/2004 | Kondo et al. ................. | 156/209 |
| 6,835,844 B2 * | 12/2004 | Nakamura et al. ............ | 549/35 |
| 6,973,021 B2 * | 12/2005 | Kondo et al. ............. | 369/275.1 |
| 7,026,030 B2 * | 4/2006 | Itoh et al. .................. | 428/64.1 |
| 2003/0021940 A1 * | 1/2003 | Arakawa .................... | 428/64.4 |
| 2003/0091178 A1 * | 5/2003 | Arakawa et al. ........... | 428/64.4 |
| 2004/0257972 A1 * | 12/2004 | Kitano et al. ............ | 369/275.5 |
| 2005/0158500 A1 * | 7/2005 | Kitano et al. .............. | 428/40.1 |

FOREIGN PATENT DOCUMENTS

| | | |
|---|---|---|
| JP | 08-235644 A | 9/1996 |
| JP | 09-63112 A | 3/1997 |
| JP | 09-147417 A | 6/1997 |
| JP | 11-314323 | 11/1999 |
| JP | 2000-251335 | 9/2000 |
| WO | 96/17266 | 6/1996 |
| WO | WO 01/48750 A1 * | 7/2001 |

* cited by examiner

PHOTO-CURABLE TRANSFER SHEET, LAMINATE, OPTICAL INFORMATION RECORDING SUBSTRATE, PROCESS FOR THE PREPARATION THEREOF, AND OPTICAL INFORMATION RECORDING MEDIUM

BACKGROUND OF INVENTION

1. Field of the Invention

The present invention relates to an optical information recording medium, such as DVD (Digital Versatile Disc), CD (Compact Disc), in which a large amount of information such as letters, sound and animation is recorded and/or recordable as digital signals, an optical information recording substrate used in the medium, and a process for the preparation thereof, and further a photo-curable transfer sheet and a laminate useful in the preparation of the substrate.

2. Description of the Related Art

As an optical information recording medium in which digital signals have been already recorded by forming pits on its surface, CD and CD-ROM are widely used. Recently, DVD that the animation can be also recorded by forming pits on its both (double) sides has been noted as the next generation recording medium instead of CD and increasingly used. Further, attention is directed to recordable discs such as CD-R, DVD-R and DVD-RW having groove(s) or grooves and pits thereon.

Conventional DVD having recording layers (surfaces) on its both sides includes a disc readable from double sides, as shown in FIG. 10, in which each of reflective layers 1a, 2a is formed on a surface of signal-pits of each of transparent resin substrates 1, 2 having the surface of signal-pits on its one side, and the two transparent resin substrates 1, 2 are bonded to each other through an adhesive layer 3 such that the reflective layers 1a, 2a are faced to each other; and a disc readable from single side, as shown in FIG. 11, in which a semitransparent reflective layers 1b is formed on a surface of signal-pits of a transparent resin substrate 1 while a reflective layers 2a is formed on a surface of signal-pits of another transparent resin substrate 2 and the two transparent resin substrates 1, 2 are bonded to each other through an adhesive layer 3 such that the semitransparent reflective layers 1b and the reflective layer 2a are faced to each other.

The DVD readable from double sides can be prepared, for example, by subjecting melted polycarbonate resin to injection molding by the use of a stamper having unevenness (concave and convex) corresponding to the reverse of unevenness of the signal-pit to be recorded on the substrate to prepare a transparent resin substrate having unevenness on its surface, forming a reflective layer on the uneven surface by spattering metal such as aluminum on it, and bonding two transparent resin substrates obtained in the above manner to each other through an adhesive such that the two reflective layers are faced to each other.

SUMMARY OF THE INVENTION

Though the transparent resin substrate of DVD is obtained by injection molding of polycarbonate using a stamper as described above according to transferring mechanism, the formation of pits by the injection molding brings about reduction of precision of the transferred pit shape, particularly in case of a substrate having thickness of 300 µm or less (see JA-11-273147). Further, the present inventors have found a problem that a land portion of the surface having the pits comes to rough.

Moreover, with increase of amount of information to be recorded, appearance of an optical information recording medium having storage capacity more than a medium now in use is expected. To obtain the excellent medium, it is required not only to reduce the sizes of the signal pits and grooves but also to decrease the wavelength of laser beam for reading the signals or laser beam for writing. However, the reduction of wavelength brings about reduction of distance to the surface of pits and therefore a thickness of the optical information recording medium is also required to be reduced.

Though DVD such as DVD-ROM has surfaces of signals (pits) which can be read from one side of DVD, the number of the surfaces of signals is generally up to two. For the future, increase of information to be recorded is expected. However, in case the optical information recording medium is multi-layered by the process using injection molding previously mentioned, a thickness of the obtained optical information recording medium large comes to so large because thin substrate can not be used owing to difficulty of formation of precise pit shape by the use of a thin substrate. Hence, it is difficult to prepare a multi-layered optical information recording medium by the conventional process.

Further, JA-11-273147 mentioned previously describes that a pressure-sensitive adhesive sheet or a dry photopolymer is used in addition to a ultraviolet (UV)-curable resin to bond a transparent film to a substrate having an unevenness surface prepared by injection molding. However, the publication also describes that the dry photopolymer has low transparency and therefore is not preferred for the bonding. Thus, the publication has has no teaching to use the dry photopolymer for formation of the unevenness (i.e., pits surface).

In view of the above-mentioned problems, the object of the present invention is to provide a photo-curable transfer sheet to which an unevenness surface of a stamper for preparing a substrate of an optical information recording medium can be easily and precisely transferred, and especially by which a thin substrate having thickness of 300 µm or less can be advantageously prepared.

Further, the object of the present invention is to provide an optical information recording substrate to which an unevenness surface of a stamper has been precisely transferred.

Furthermore, the object of the present invention is to provide a process for the preparation of the above-mentioned optical information recording substrate.

Moreover, the object of the present invention is to provide an optical information recording medium on which precise pits and/or grooves have formed, and especially which has small thickness.

Further, the object of the present invention is to provide a laminate of a stamper and an optical information recording substrate on which precise pits and/or grooves have formed.

Furthermore, the object of the present invention is to provide an optical information recording medium having multi signal-surfaces and small thickness.

Particularly, the object of the present invention is to provide a multi-layered optical information recording medium having three or more signal-surfaces which is used in single-side reading (reproduction) system.

Moreover, the object of the present invention is to a process for the preparation of the above-mentioned optical information recording media.

The invention of the present invention is provided by a photo-curable transfer sheet having a photo-curable layer (which is a photo-curable transfer layer because the photo-curable layer is transferable) comprising a photo-curable composition, the photo-curable composition being deformable by application of pressure and containing a reactive polymer having a photopolymerizable functional group.

In the above photo-curable transfer sheet, the photo-curable composition preferably has a glass transition temperature of not more than 20° C., whereby formation of unevenness can be carried out by pressing at room temperature. The photo-curable transfer sheet and/or the cured photo-curable transfer sheet (generally an optical information recording substrate) generally has a light transmittance of not less than 70% in a wavelength rang of 380 to 420 nm (preferably 380 to 600 nm, especially 380 to 800 nm). In case the signals recorded in the optical information recording medium obtained by using this photo-curable transfer sheet is read out with a laser beam, the reading out can be conducted without error. The photo-curable layer preferably has cure shrinkage of not more than 8%, whereby the fluctuation of pit shape can be suppressed to the minimum.

The photo-curable composition containing a reactive polymer preferably has a glass transition temperature of not more than 20° C. The photo-curable layer generally consists of only the photo-curable composition. The reactive polymer preferably has 1 to 50% by mole of the photopolymerizable functional group to have appropriate curing properties and to obtain appropriate strength of the layer after curing. Further the photopolymerizable functional group preferably is a (meth)acryloyl group topolymerizable functional group preferably is a (meth)acryloyl group from the viewpoint of curing properties. Moreover, the photo-curable composition generally contains 0.1 to 10% by weight of a photopolymerization initiator. The photo-curable layer preferably has a thickness of 1 to 1,200 µm, more preferably 5 to 500 µm, especially 5 to 300 µm in view of transferring properties and workability The photo-curable transfer sheet preferably comprises a support and a photo-curable layer provided on the support so as to easily carry out a transferring operation. Even if the support has a thickness of 30 to 300 µm, good transferring properties can be obtained. Otherwise, the photo-curable layer preferably is per se the photo-curable transfer sheet. Thus, it is possible to render the optical information recording medium thin.

Further, the present invention is provided by an optical information recording substrate having an uneven surface of recorded pits and/or grooves, wherein a layer (portion) containing at least the uneven surface of the substrate is formed by curing a photo-curable layer comprising a photo-curable composition, the photo-curable composition being deformable by application of pressure and containing a reactive polymer having a photopolymerizable functional group.

The preferred embodiments described in the above-mentioned photo-curable transfer sheet can be applied to the above optical information recording substrate.

The optical information recording substrate can be advantageously prepared by a process comprising placing the above-mentioned photo-curable transfer sheet on an uneven surface of a stamper having the uneven surface of recorded pits and/or grooves such that the photo-curable layer is in contact with the uneven surface, depressing them to form a laminate having the stamper and the photo-curable layer in contact with the uneven surface of the stamper, and exposing the photo-curable layer to light, and then removing the stamper from the laminate.

In the process, the pressing is preferably performed under reduced pressure.

There can be advantageously employed in the process a laminate comprising a stamper having an uneven surface of recorded pits and/or grooves, and the photo-curable layer of the photo-curable transfer sheet provided on the uneven surface.

The present invention is provided by an optical information recording medium comprising an optical information recording substrate having an uneven surface of recorded pits and/or grooves and a reflective layer formed on the uneven surface, and another optical information recording substrate having an uneven surface of recorded pits and/or grooves and a semi-transparent reflective layer formed on the uneven surface, both the substrates being bonded to each other through an adhesive layer such that both the reflective layers are faced to each other, wherein a layer (portion) containing at least the uneven surface of at least one of the substrates is formed by curing a photo-curable layer comprising a photo-curable composition, the photo-curable composition being deformable by application of pressure and containing a reactive polymer having a photopolymerizable functional group.

The above optical information recording medium is generally used in reading system from single side. In reading system from double sides, it is conventional to change the semitransparent reflective layer to a (full) reflective layer.

The preferred embodiments described in the photo-curable transfer sheet mentioned previously can be applied to the above optical information recording medium.

Moreover, the present invention is provided by an optical information recording medium comprising an optical information recording substrate having an uneven surface of recorded pits and/or grooves and a reflective layer formed on the uneven surface, and another optical information recording substrate having an uneven surface of recorded pits and/or grooves and a semitransparent reflective layer formed on the uneven surface, both the substrates being bonded to each other through an adhesive layer such that the reflective layer of the former substrate faces the surface having no reflective of the latter substrate, wherein a layer (portion) containing at least the uneven surface of at least one of the substrates is formed by curing a photo-curable layer comprising a photo-curable composition, the photo-curable composition being deformable by application of pressure and containing a reactive polymer having a photopolymerizable functional group. Further, another medium having the structure of the above medium is prepared, and these two media are bonded to each other through an adhesive such that both the reflective layers are faced to each other to obtain a medium having four layers, which is preferred. Furthermore, a medium comprising bonding one of the above media to a conventional transparent resin substrate is preferred, and also a medium comprising bonding one of the above media to the optical information recording substrate having an uneven surface of recorded pits and/or grooves and a reflective layer thereon is preferred.

The preferred embodiments described in the photo-curable transfer sheet mentioned previously can be applied to the above optical information recording medium.

The present invention is provided by a laminate comprising a stamper having an uneven surface of recorded pits and/or grooves, and the photo-curable layer of the photo-curable transfer sheet provided closely on the uneven surface.

The laminate is advantageously prepared by a method for the lamination comprising depressing (pressing) the photo-curable layer of the photo-curable transfer sheet on an uneven surface of a stamper having the uneven surface of recorded pits and/or grooves. The pressing is preferably carried out under reduced pressure.

The preferred embodiments described in the photo-curable transfer sheet previously mentioned can be applied to the laminate.

Furthermore, the present invention is provided by an optical information recording medium comprising an transparent supporting substrate and three or more optical information recording substrates having an uneven surface of recorded pits and/or grooves and a reflective layer formed on the uneven surface, all the optical information recording substrates being bonded to the transparent supporting substrate in order through an adhesive layer such that the reflective layer faces the surface of the transparent supporting substrate or the surface having no reflective layer of the optical information recording substrates, wherein a layer (portion) containing at least the uneven surface of at least one of the optical information recording substrates is formed by curing a photo-curable layer comprising a photo-curable composition, the photo-curable composition being deformable by application of pressure and containing a reactive polymer having a photopolymerizable functional group. The layer (portion) containing at least the uneven surface of at least one of the optical information recording substrates generally consists the uneven surface and a layer in the vicinity of the uneven surface.

The preferred embodiments described in the photo-curable transfer sheet previously mentioned can be applied to the above optical information recording medium.

Further, the reflective layers are disposed such that their transmittance are reduced with increase of distance to the supporting substrate, i.e., such that all the recorded surfaces are readable with a laser beam from one side. The surface of the supporting substrate facing the adhesive layer may have unevenness of recorded pits and further a reflective layer formed on the uneven surface.

The above-mentioned optical information recording medium can be advantageously prepared by a process comprising:

placing the photo-curable transfer sheet having the photo-curable layer previously mentioned on an uneven surface of a stamper having the uneven surface for forming recorded pits such that the photo-curable layer is in contact with the uneven surface, depressing them to form a laminate having the stamper and the photo-curable layer in contact with the uneven surface of the stamper, exposing the photo-curable layer to light to cure the layer, and removing the stamper from the laminate to prepare an optical information recording substrate having the uneven surface of recorded pits; and then preparing three or more optical information recording substrate having recorded pit different from each other in the above manner, forming a reflective layer on the uneven surface of each of the substrates, superposing all the optical information recording substrates on a transparent supporting substrate in order through an adhesive layer such that the reflective layer faces the surface of the transparent supporting substrate or the surface having no reflective layer of the optical information recording substrates and bonding them to one another by the adhesive layer.

The preferred embodiments described in the photo-curable transfer sheet and the medium previously mentioned can be applied to the above process.

DETAILED DESCRIPTION OF THE INVENTION

Embodiments of the invention are explained in detail by referring to drawings.

Figure 1:
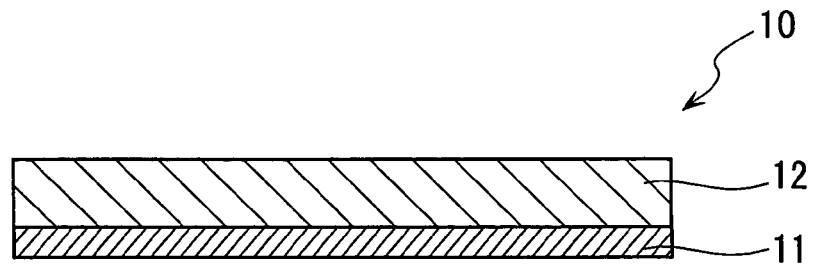
FIG. 1 is a section view showing an example of an embodiment of the photo-curable transfer sheet of the present invention.

FIG. 1 is a section view showing an example of an embodiment of the photo-curable transfer sheet of the present invention. FIG. 1 shows a photo-curable transfer sheet 10 consisting of a support 12 and a photo-curable layer 11 formed on the support 12. When the photo-curable layer 11 has self-supporting properties, the sheet may have no support. The photo-curable layer 11 is easily deformable by application of pressure such that unevenness of a stamper can be precisely transferred to the layer by depressing the stamper and the layer. Particularly, the photo-curable layer 11 is preferably composed mainly of a photo-curable composition containing a reactive polymer having a photopolymerizable functional group and a glass transition temperature of not more than 20° C. Further, the photo-curable layer 11 preferably has a light transmittance of not less than 70% in a wavelength rang of 380 to 420 nm so as to easily read out information form the unevenness surface of the sheet with a reading laser beam. The light transmittance in a wavelength rang of 380 to 420 nm is especially preferred not less than 80%. Thus, the optical information recording medium of the invention prepared by using the photo-curable layer 11 is advantageously used in a method reading out information from pit signals using a laser beam of wavelength of 380 to 420 nm.

Figure 2:
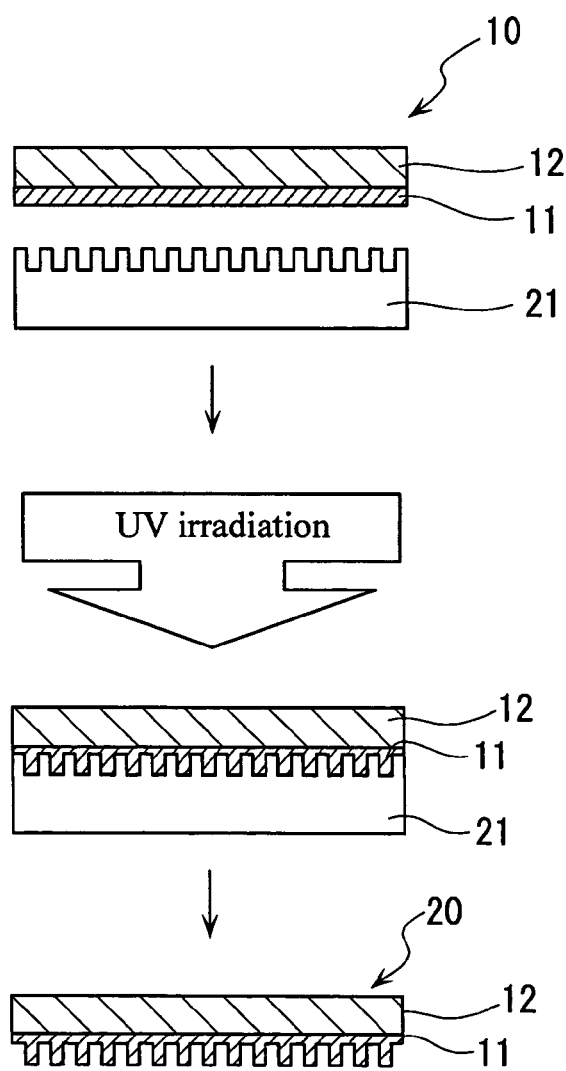
FIG. 2 is a section view showing an example of a process for preparing the optical information recording substrate and the laminate of the present invention.

The optical information recording substrate and laminate can be prepared using the above photo-curable sheet 10, for example, as shown in FIG. 2.

The photo-curable transfer sheet 10 comprising the support 12 and the photo-curable layer 11 provided thereon is disposed on an uneven surface of a stamper 21 having the uneven surface of recorded pits such that the photo-curable layer 11 faces the uneven surface, superposing them, and depressing them such that the photo-curable layer 11 is brought into close contact with the uneven surface, whereby a laminate having the stamper 21 and the photo-curable layer 11 is obtained. Then, the support of the photo-curable sheet is exposed to UV (ultraviolet ray), whereby the photo-curable layer 11 is cured and then the stamper 21 is removed from the laminate to obtain an optical information recording substrate 20.

In the invention, the photo-curable layer 11 is designed such that the uneven shape of recorded pits of the stamper 21 can be precisely transferred to the photo-curable layer 11 by depressing the layer (sheet) onto the stamper at low temperature of 100° C. or less. Superposition of the stamper 21 and the photo-curable layer 11 is generally carried out using a pressure rollers or easy press. The photo-curable layer 11 after curing is weakly stuck to metal such as nickel used in the stamper, and therefore the photo-curable layer 11 can be easily peeled from the stamper 21.

Figure 3:
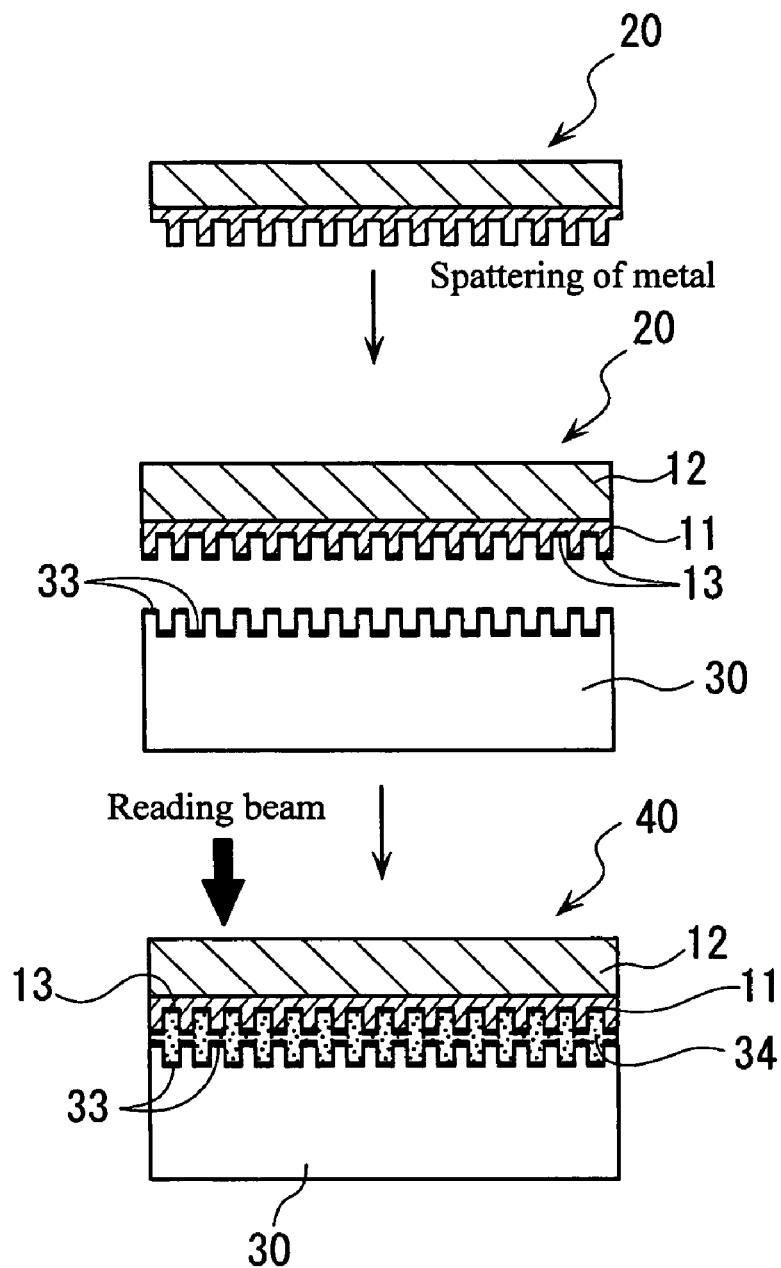
FIG. 3 is a section view showing an example of a process for preparing the optical information recording medium of the present invention.

The optical information recording medium can be prepared using the above-mentioned optical information recording substrate 20, for example, as shown in FIG. 3.

The uneven surface of the optical information recording substrate 20 obtained above is metallized (deposited) by sputtering process using silver alloy, whereby a silver alloy reflective layer (semitransparent reflective layer) 13 is formed on the substrate. Separately, the uneven surface of an optical information recording substrate 30 is metallized by sputtering process using aluminum, whereby an Al reflective layer 33 is formed on the substrate. The substrate 20 having the semitransparent reflective layer 13 and the substrate 30 having the Al reflective layer 33 are disposed such that both the reflective layers are faced to each other and superposed through an adhesive, and the adhesive is cured to form an adhesive layer 34, whereby the optical information recording medium 40 is obtained.

In the above process, the optical information recording medium exclusively used for reproduction is explained. However, an optical information recording medium used for recording (writing) is also prepared in the same manner as the above process. In the recordable medium, for example, grooves or grooves and pits is provided instead of the pits, and a metal recording layer is provided instead of the (semi) reflective layer. When the recording layer is a dye-recording layer, a recording layer and reflective layer are provided.

The optical information recording substrate 30, which is generally a thick plate, may be prepared by a conventional injection molding or by the process for the preparation of the optical information recording substrate of the invention. The optical information recording substrate of the invention can be prepared so as to have a thickness of 300 μm or less. Therefore, when another substrate is prepared by a conventional process, the thickness of the another substrate can be increased to improve the precision of pit and /or groove shape. The adhesives used for forming the adhesive layer include a conventional hot-melt type adhesive and UV-curable resin adhesive.

Figure 4:
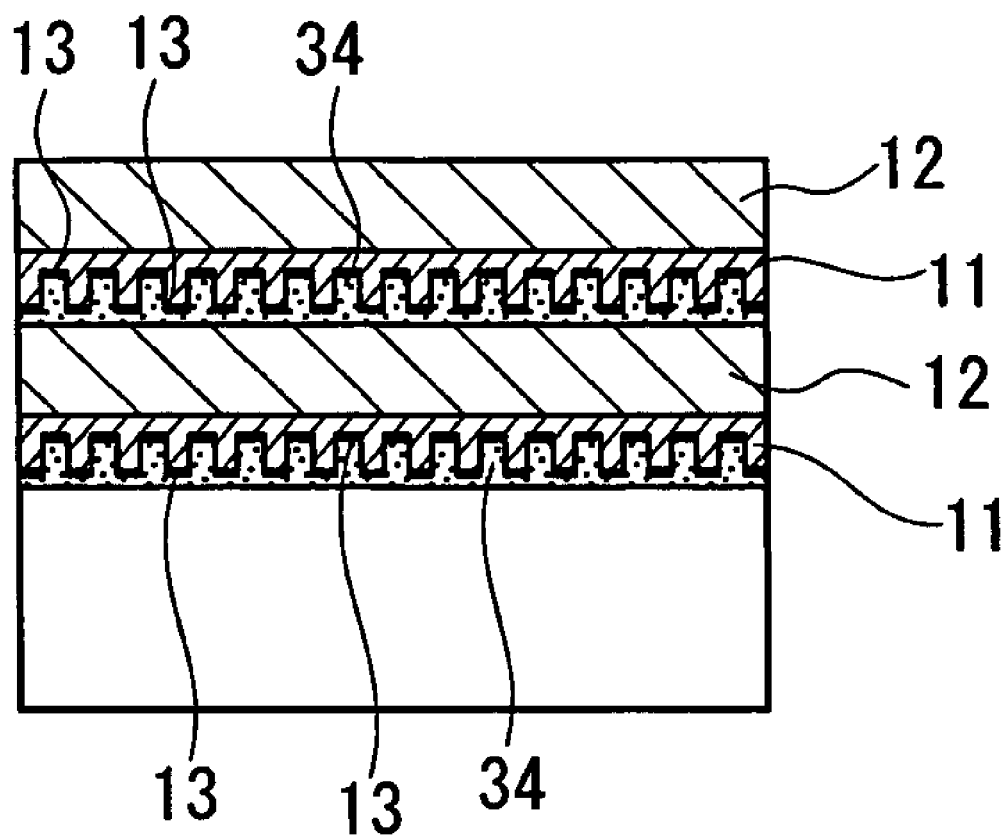
FIG. 4 is a section view showing another example of the optical information recording medium of the present invention.

Further, the following media are preferred: Two optical information recording substrates 20 mentioned above, i.e., one substrate having a full reflective layer such as Al layer and the other substrate having a semitransparent reflective layer, are prepared, the two substrates are bonded each other through an adhesive such that the full reflective layer faces the surface having no unevenness to form a laminate, and another laminate is prepared in the same manner as above, the resultant two laminates are bonded to each other through an adhesive such that both the reflective layers are faced to each other, and hence an optical information recording medium having four recorded surfaces is obtained. Also, the above one laminate is bonded onto a transparent supporting substrate whereby an optical information recording medium shown in FIG. 4 can be obtained. Also, the above one laminate is bonded onto a conventional transparent supporting substrate having uneven surface and a reflective layer thereon to give an optical information recording medium. In the media, the semitransparent reflective layer is provided on the incident side of the reading laser beam. These media can be used as conventional four-layer type and three-layer type in double sides reading system and two-layer type in single side reading system, respectively.

Otherwise, unevenness is formed on a part of a substrate, a reflective layer is formed thereon, and a recording layer, on which information can be written, is provided thereon.

Figure 5:
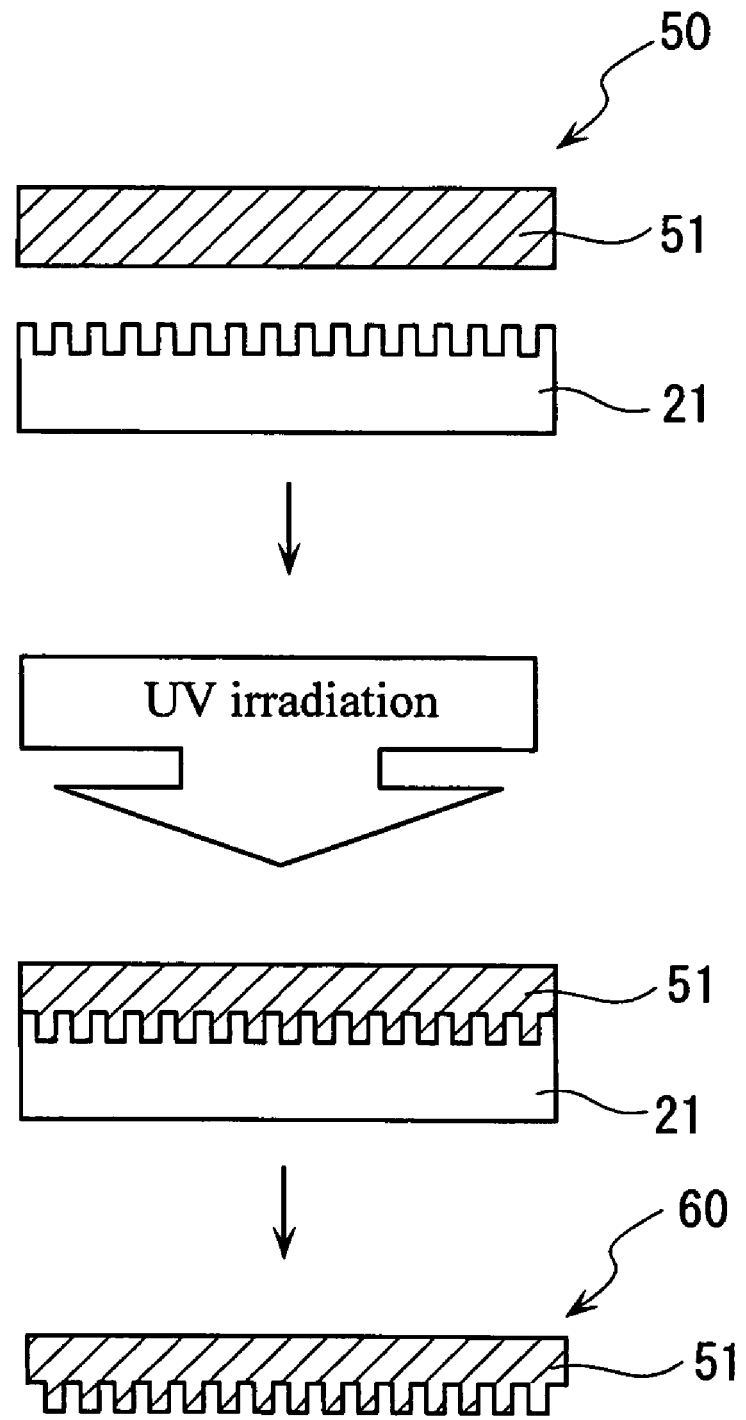
FIG. 5 is a section view showing another example of a process for preparing the optical information recording substrate and the laminate of the present invention.

Procedure for the preparation of an optical information recording substrate and a laminate using a photo-curable transfer sheet having no support (consisting of only photo-curable layer) is explained by referring to FIG. 5. The procedure is basically carried out according to the procedure indicated in FIG. 2.

A photo-curable transfer sheet 50 comprising a photo-curable layer 51 is disposed on an uneven surface of a stamper 21 having the uneven surface of recorded pits such that the photo-curable layer 51 faces the uneven surface, superposing them, and depressing them such that the photo-curable layer 51 is brought into close contact with the uneven surface, whereby a laminate composed of the stamper 21 and the photo-curable layer 51 is obtained. Then, the surface having no unevenness of the photo-curable sheet 50 is exposing to UV, whereby the photo-curable layer 51 is cured, and then the stamper is removed from the laminate to obtain an optical information recording substrate 60. Though both sides of the photo-curable transfer sheet 50 are generally covered with peelable sheets before use, the peelable sheets are removed at the time of use.

Figure 6:
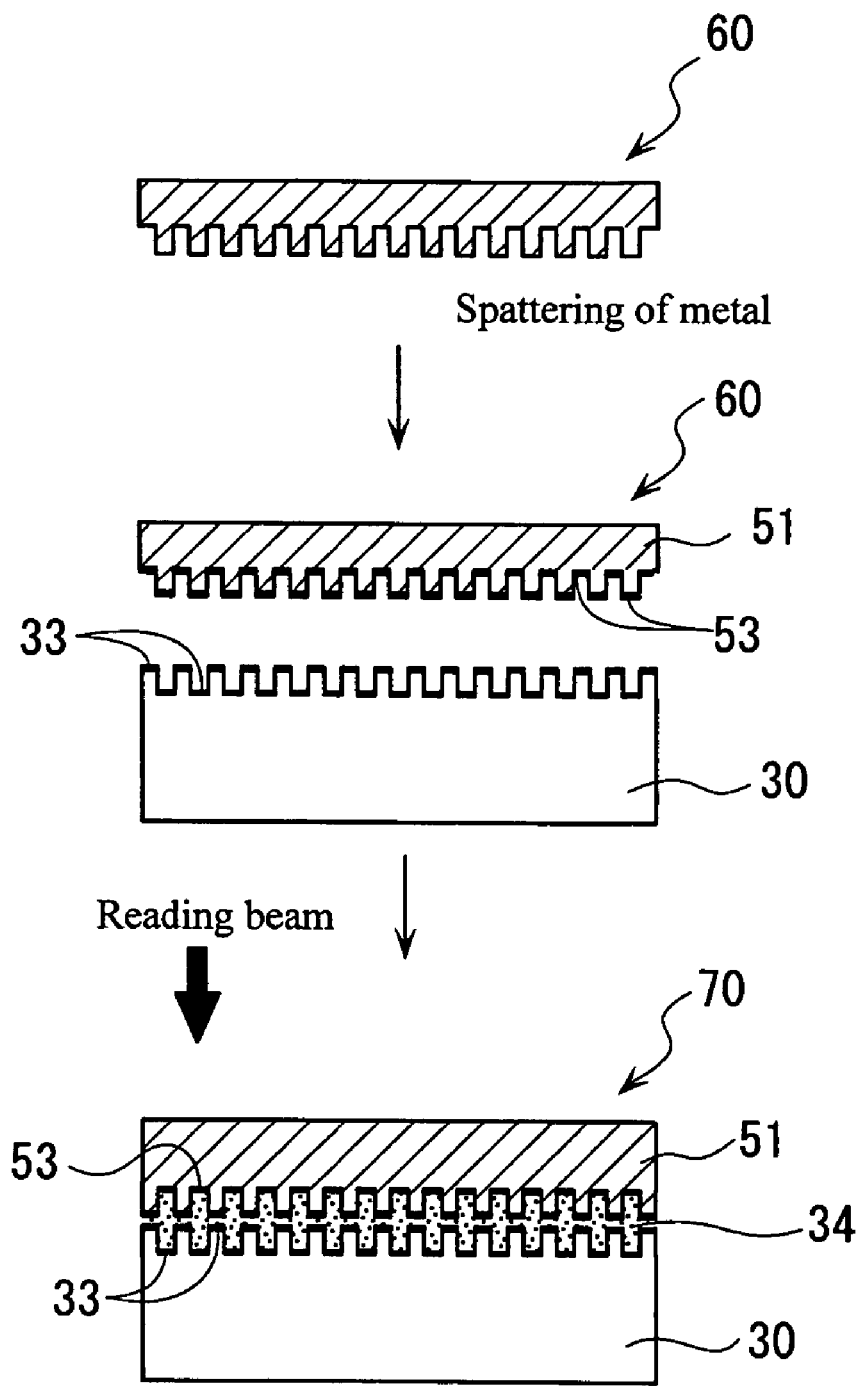
FIG. 6 is a section view showing an example of a process for preparing the optical information recording medium of the present invention.

Further, an optical information recording medium can be prepared by using the optical information recording substrate prepared above as shown in FIG. 6. This procedure can be almost carried out according to the same procedure as in FIG. 3.

The uneven surface of the optical information recording substrate 60 obtained above is metallized (deposited) by sputtering process using silver alloy, whereby a silver alloy reflective layer (semitransparent reflective layer) 53 is formed on the substrate. Separately, the uneven surface of an optical information recording substrate 30 is metallized by sputtering process using aluminum, whereby an Al reflective layer 33 is formed on the substrate. The substrate 60 having the semitransparent reflective layer 53 and the substrate 30 having the Al reflective layer 33 are disposed such that both the reflective layers are faced to each other and superposed through an adhesive, and then the adhesive is cured to form an adhesive layer 34, whereby the optical information recording medium 70 is obtained.

Figure 7:
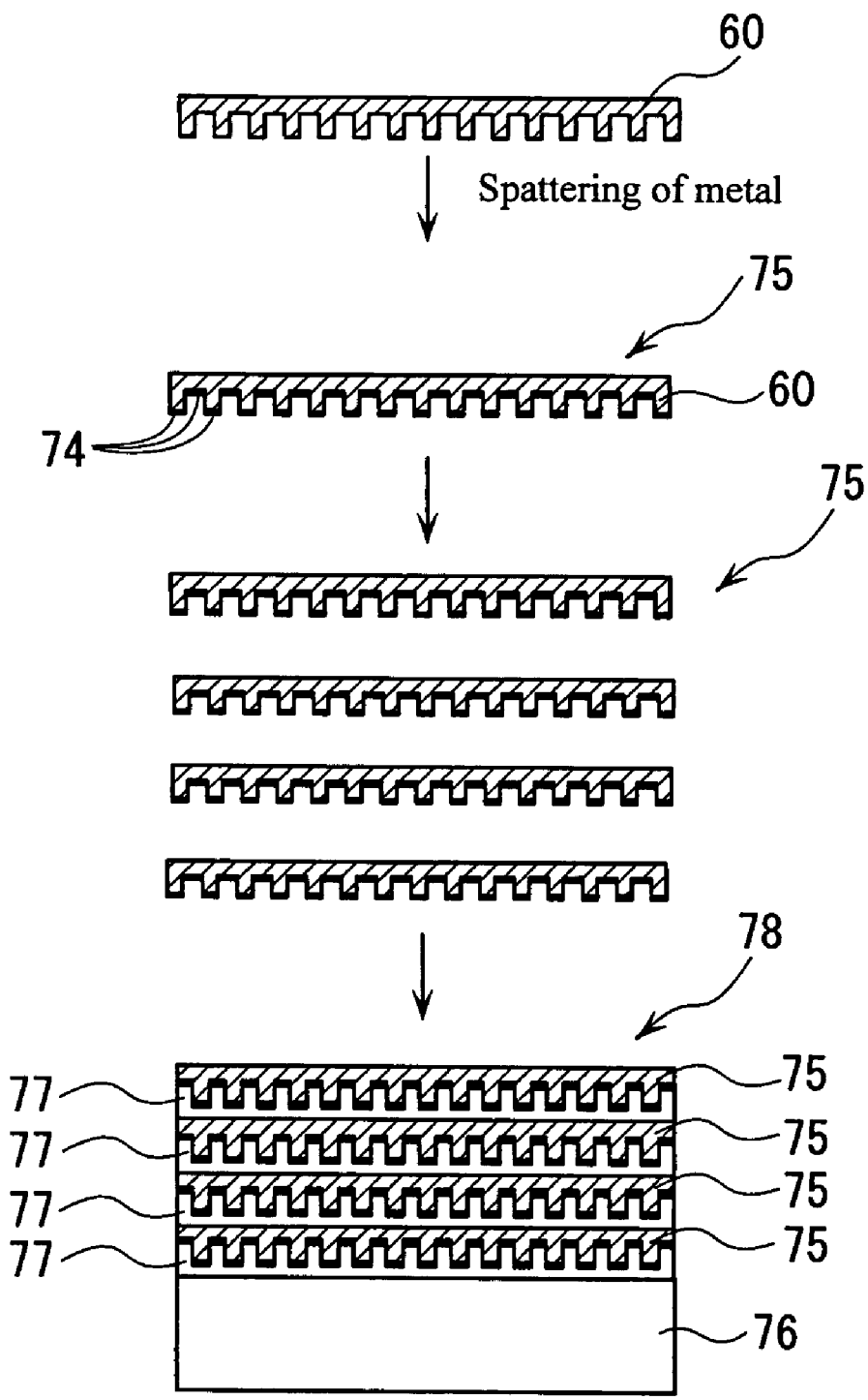
FIG. 7 is a section view showing another example of the optical information recording medium of the present invention and an example of a process for preparing this medium.

Three or more (preferably four or more) optical information recording substrates 60 as shown in FIG. 6, which have different information (recorded pits) from one another, are prepared. An optical information recording according to other embodiment of the invention can be prepared, for example as shown in FIG. 7, by using the optical information recording substrates 60.

Silver alloy, gold or aluminum is sputtered to unevenness surfaces of plural optical information recording substrates mentioned above to form reflective layers (e.g., silver alloy layer) 74, whereby optical information recording substrates having reflective layers (optical information recording media) 75. For example, in FIG. 7, an optical information recording substrate having a silver-alloy reflective layer (having low reflectivity) is provided in the position most close to a transparent supporting substrate, and optical information recording substrates having a reflective layer of lower transmittance (e.g., Al reflective layer) are provided with increase of distance to the transparent supporting substrate. Thus, four optical information recording substrates provided with a reflective layer are prepared. The four optical information recording substrates 75 are superposed in order on a transparent supporting substrate 76 having a large thickness through an adhesive such that the reflective layer faces the transparent supporting substrate 76 or the surface having no reflective layer of the optical information recording substrates 75, and the adhesive layer is cured to form an adhesive layer 77, whereby an optical information recording medium 78 is obtained.

The reflective layers are generally designed such that information can be read out from all pit signals with a leaser by appropriately selecting kinds of metal material used or the thickness per each substrate.

The transparent supporting substrate generally has no uneven surface. However, the transparent supporting substrate may have an uneven surface. The transparent supporting substrate having an uneven surface (i.e., optical information recording substrate) generally is a thick plate, and therefore it can be prepared by conventional injection molding but it may be prepared by the process for the preparation of the optical information recording substrate according to the invention. The thickness of the optical information recording substrate of the invention can be rendered small (300 μm or less), and therefore a number of optical information recording substrates can be laminated on the transparent supporting substrate. Hence, the resultant optical information recording medium has a lot of uneven surfaces to greatly enhance the amount of information. The thickness of the transparent supporting substrate generally is 300 to 1,000 μm, preferably 400 to 800 μm.

The transparent supporting substrate 76 is generally prepared by a conventional injection molding. Materials of the transparent supporting substrate include, for example, polycarbonate, polymethyl methacrylate, polyethylene, polypropylene, polyvinyl alcohol, polyacrylonitrile and polyvinyl chloride.

The two optical information recording media 78 prepared above are bonded to each other through an adhesive such that both the transparent supporting substrates are faced to each other to obtain an optical information recording medium having eight signal-surfaces and readable on the both (double) sides.

Figure 8:
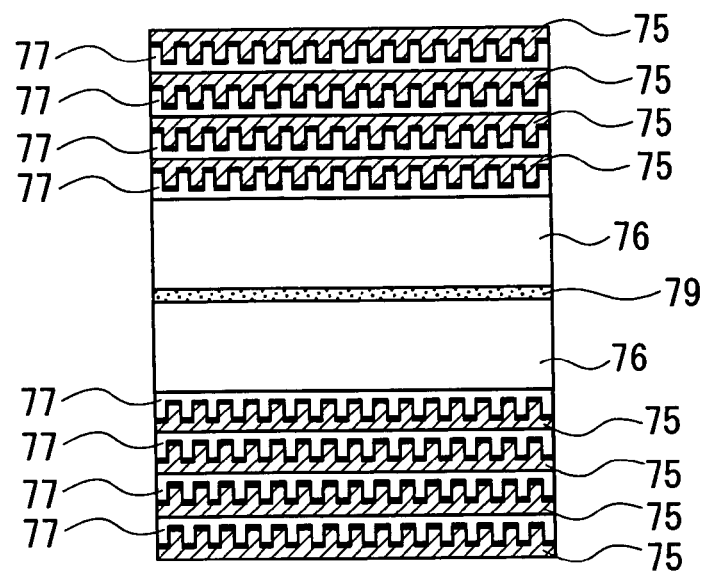
FIG. 8 is a section view showing a further example of the optical information recording medium of the present invention.

FIG. 8 shows the optical information recording medium having eight signal-surfaces (uneven surfaces) and readable on the both sides. The reference number 79 is an adhesive layer.

Adhesives for forming the adhesive layer include conventional hot melt adhesive and UV-curable resin adhesive.

In case the photo-curable transfer sheet has no support (i.e., consists of only photo-curable layer) as mentioned above, this sheet generally has a release sheet (film) on both sides thereof. One of the two release sheets is removed when it is used (e.g., when the transfer sheet is depressed on the stamper), and the other is removed after completion of the step.

When the photo-curable transfer sheet is depressed in the step shown in FIG. 2 and FIG. 5, or when the two photo-curable transfer sheets are superposed thorough an adhesive such that both the reflective layers are faced to each other, it is preferred to carry out the depressing or the superposing operation under reduced pressure. Thereby, bubbles in the sheet can be smoothly removed.

The depressing operation under the reduced pressure can be performed by a method comprising passing the photo-curable transfer sheet and the stamper between two rolls under reduced pressure, or by a method comprising placing the stamper in a mold of a vacuum molding device and bring the photo-curable transfer sheet into contact with the stamper under reduced pressure.

Figure 9:
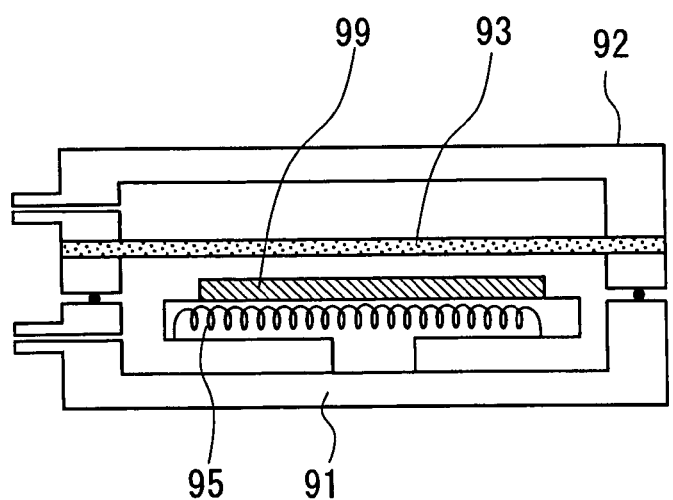
FIG. 9 is a schematic view for explaining a depressing method using a device according to a double vacuum chamber system.
Figure 10:
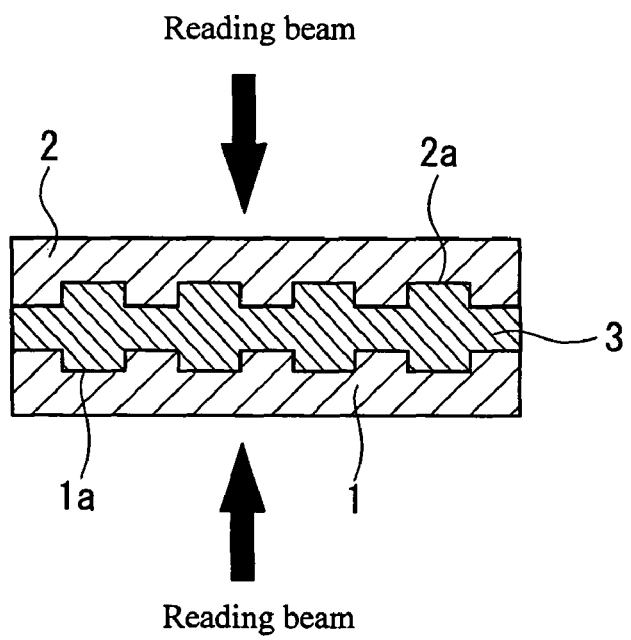
FIG. 10 is a section view showing an example of a conventional optical information recording medium.
Figure 11:
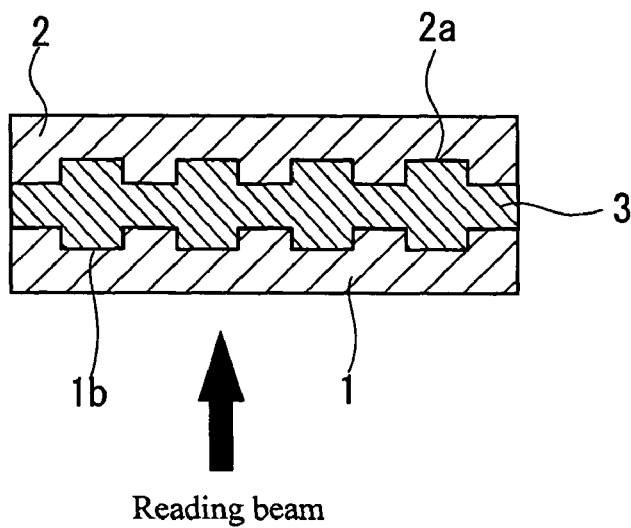
FIG. 11 is a section view showing another example of a conventional optical information recording medium.

Further, the depressing operation under the reduced pressure can be performed using a device according to a double vacuum chamber system. The operation is explained by referring to FIG. 9. FIG. 9 shows a laminator according to a double vacuum chamber system. The laminator is provided with a lower chamber 91, an upper chamber 92, a sheet of silicone rubber 93 and a heater 95. A laminate 99 consisting of a stamper having unevenness or a transparent supporting substrate and a photo-curable transfer sheet provided thereon is placed in the lower chamber 91 of the laminator. In both the upper chamber 92 and lower chamber 91, air is removed under reduced pressure. The laminate 99 is heated with a heater 95, and air is introduced into the upper chamber 92 to allow the chamber to be at atmospheric pressure while the lower chamber is kept under reduced pressure, whereby the laminate is depressed to be contact bonded. After cooling, the laminate is taken out and transformed to the next step. This operation permits sufficient deaeration under reduced pressure, and therefore, the stamper or transparent supporting substrate and the photo-curable transfer sheet can be contact bonded without bubbles.

The photo-curable layer of the photo-curable transfer sheet of the invention used in the above preferably comprises the photo-curable composition containing a reactive polymer having a photopolymerizable functional group and a glass transition temperature of not more than 20° C.

The photo-curable composition generally comprises the reactive polymer having a photopolymerizable functional group, a compound (e.g., monomer, oligomer) having a photopolymerizable functional (preferably (meth)acryloyl group), a photopolymerization initiator, and if necessary other additives.

Examples of the reactive polymer having a photopolymerizable functional group include homopolymers or copolymers (i.e., acrylic resins having a photopolymerizable functional group) derived from alkyl acrylate (e.g., methyl acrylate, ethyl acrylate, butyl acrylate or 2-ethylhexyl acrylate) and/or alkyl methacrylate (e.g., methyl methacrylate, ethyl methacrylate, butyl methacrylate or 2-ethylhexyl methacrylate) and having a photopolymerizable functional group on its main chain or side chain. These (co)polymers can be obtained, for example, by copolymerizing one or more (meth) acrylate mentioned above with (meth)acrylate (e.g., 2-hydroxyethyl (meth)acrylate) having a functional group such as —OH and reacting the resultant polymer with a compound (e.g., isocyanatoalkyl (meth)acrylate) having a functional group capable of reacting with the functional group of the polymer and having a photopolymerizable functional group.

The reactive polymer of the invention has generally 1 to 50% by mole, preferably 5 to 30% by mole of the photopolymerizable functional group. Examples of the photopolymerizable functional group preferably include acryloyl, methacryloyl and vinyl groups, especially acryloyl, and methacryloyl groups.

In case the reactive polymer having glass transition temperature of not more than 20° C. is used as above, the resultant photo-curable layer having flexibility can follow exactly the uneven surface of the stamper even at room temperature when the layer is depressed on the stamper. The reactive polymer especially has glass transition temperature of 15 to −50° C. because the resultant photo-curable layer can follow more exactly the uneven surface. When the glass transition temperature exceeds the upper limit, high pressure and temperature is needed for the depressing or bonding step of the layer. When the glass transition temperature falls to below the lower limit, the resultant layer does not have sufficient hardness.

The reactive polymer of the invention generally has number-average molecular weight of 5,000 to 1,000,000, preferably 10,000 to 300,000, and/or generally has weight-average molecular weight of 5,000 to 1,000,000, preferably 10,000 to 300,000.

Examples of the polymerizable unsaturated compounds having a photopolymerizable group include (meth)acrylate monomers such as 2-hydroxyethyl (meth)acrylate, 2-hydroxyropyl (meth)acrylate, 4-hydroxybutyl (meth)acrylate, 2-ethylhexylpolyethoxy (meth)acrylate, benzyl (meth)acrylate, isobornyl (meth)acrylate, phenyloxyethyl (meth)acrylate, tricyclodecane mono(meth)acrylate, dicyclopentenyloxyethyl (meth)acrylate, tetrahydrofurfuryl (meth)acrylate, acryloylmorpholine, N-vinylcaprolactam, 2-hydroxy-3-phenyloxypropyl (meth)acrylate, o-phenylphenyloxyethyl (meth)acrylate, neopentylglycol di(meth)acrylate, neopentyl glycol dipropoxy di(meth)acrylate, neopentyl glycol hydroxypivalate di(meth)acrylate, tricyclodecanedimethylol di(meth)acrylate, 1,6-hexanediol di(meth)acrylate, nonanediol di(meth)acrylate, trimethylolpropane tri(meth)acrylate, pentaerythritol tri(meth)acrylate, pentaerythritol tetra(meth)acrylate, tris[(meth)acryloxyethyl]isocyanurate and ditrimethylolpropane tetra(meth)acrylate; and the following (meth)acrylate oligomer such as:

polyurethane (meth)acrylate such as compounds obtained by reaction of:

a polyol compound (e.g., polyol such as ethylene glycol, propylene glycol, neopentyl glycol, 1,6-hexanediol, 3-methyl-1,5-pentanediol, 1,9-nonanediol, 2-ethyl-2-butyl-1,3-propanediol, trimethylolpropane, diethylene glycol, dipropylene glycol, polypropylene glycol, 1,4-dimethylolcyclohexane, bisphenol-A polyethoxydiol and polytetramethylene glycol; polyesterpolyol obtained by reaction of the above-mentioned polyol and polybasic acid or anhydride thereof such as succinic acid, maleic acid, itaconic acid, adipic acid, hydrogenated dimer acid, phthalic acid, isophthalic acid and terephthalic acid; polycaprolactone polyol obtained by reaction of the above-mentioned polyol and ε-caprolactone; a compound obtained by reaction of the above-mentioned polyol and a reaction product of the above-mentioned polybasic acid or anhydride thereof and ε-caprolactone; polycarbonate polyol; or polymer polyol), and an organic polyisocyanate compound (e.g., tolylene diisocyanate, isophorone diisocyanate, xylylene diisocyanate, diphenylmethane-4,4'-diisocyanate, dicyclopentyl diisocyanate, hexamethylene diisocyanate, 2,4,4'-trimethylhexamethylene diisocyanate, 2,2',4'-trimethylhexamethylene diisocyanate), and hydroxyl-containing (meth)acrylate (e.g., 2-hydroxyethyl (meth)acrylate, 2-hydroxyropyl (meth)acrylate, 4-hydroxybutyl (meth)acrylate, 2-hydroxy-3-phenyloxypropyl (meth)acrylate, cyclohexane-1,4-dimethylolmono (meth)acrylate, pentaerythritol tri(meth)acrylate or glycerol di(meth)acrylate);

bisphenol-type epoxy(meth)acrylate obtained by reaction of bisphenol-A epoxy resin or bisphenol-F epoxy resin and (meth)acrylic acid.

These compounds having photopolymerizable functional group can be employed singly or in combination of two or more kinds.

Any photopolymerization initiators known can be used in the invention. The initiators having good storage-stability after mixing with other components are preferred. Examples of the photopolymerization initiators include acetophenone type initiators such as 2-hidroxy-2-methyl-1-phenylpropane-1-on, 1-hydroxycyclohexylphenylketone and 2-methyl-1-[4-(methylthio)phenyl]-2-morphorino-propane-1-on; benzoin type initiators such as benzylmethylketal; benzophenone type initiators such as benzophenone, 4-phenylbenzophenone and hydroxybenzophenone; thioxanthone type initiators such as isopropylthioxanthone and 2,4-diethythioxanthone. Further, as special type, there can be mentioned methylphenylglyoxylate. Especially preferred are 2-hidroxy-2-methyl-1-phenyl-propane-1-on, 1-hydroxycyclohexylphenylketone, 2-methyl-1-[4-(methylthio)phenyl]-2-morphorinopropane-1-on and benzophenone. These photopolymerization initiators can be employed together with one or more kinds of a photopolymerization promoter such as a benzoic acid type compound (e.g., 4-dimethylaminobezoic acid) or a tertiary amine compound by mixing with the promoter in optional ratio. Only the initiator can be employed singly or in combination of two or more kinds. The initiator is preferably contained in the photo-curable composition in the range of 0.1 to 20% by weight, particularly 1 to 10% by weight.

In addition to the above-mentioned photopolymerizable initiators, the acetophenone type initiator includes 4-phenoxydichloroacetophenone, 4-t-butyldichloroacetophenone, 4-t-butyltrichloroacetophenone, diethoxyacetophenone, 2-hidroxy-2-methyl-1-phenylpropane-1-on, 1-(4-isopropylphenyl)-2-hidroxy-2-methylpropane-1-on, 1-(4-dodecylphenyl)-2-hydroxy-2-methylpropane-1-on, 4-(2-hydroxyethoxy)-phenyl(2-hydroxy-2-propyl)ketone, 1-hydroxycyclohexylphenylketone, 2-methyl-1-[4-(methylthio)phenyl]-2-morphorino-propane-1-on; and the benzophenone type initiators include benzophenone, benzoylbenzoic acid, methyl benzoylbenzoate, 4-phenylbenzophenone, hydroxybenzophenone, 4-benzoyl-4'-methylphenylsulfide and 3,3'-dimethyl-4-methoxybenzophenone.

The acetophenone type initiators preferably are 2-hidroxy-2-methyl-1-phenylpropane-1-on, 1-hydroxycyclohexylphenylketone, 2-methyl-1-[4-(methylthio)phenyl]-2-morphorinopropane-1-on, and the benzophenone type initiators preferably are benzophenone, benzoylbenzoic acid and methyl benzoylbenzoate.

Preferred examples of the tertiary amine compounds of the photopolymerization promoter include triethanolamine, methyldiethanolamine, triisopropanolamine, 4,4'-dimethylaminobenzophenone, 4,4'-diethylaminobenzophenone, ethyl 2-dimethylaminobenzonate, ethyl 4-dimethylaminobenzonate, (n-butoxy)ethyl 4-dimethylaminobenzonate, isoamyl 4-dimethylaminobenzonate and 2-ethylhexyl 4-dimethylaminobenzonate. Especially preferred are ethyl 4-dimethylaminobenzonate, (n-butoxy)ethyl 4-dimethylaminobenzonate, isoamyl 4-dimethylaminobenzonate and 2-ethylhexyl 4-dimethylaminobenzonate.

The photo-curable layer of the invention is preferably configured such that the photo-curable composition has a glass transition temperature of not more than 20° C. and transmittance of not less than 70%. Therefore the photo-curable composition preferably contains, in addition to the compound having a photopolymerizable functional group and the photopolymerization initiator, if desired the following thermoplastic resin and other additives.

The ratio by weight of the reactive polymer: the compound having a photopolymerizable functional group: the photopolymerization initiator generally is 40-100:0-60:0.1-10, preferably 60-100:0-40:1-10, especially 50-80:20-50:1-10.

As other additives, a silane coupling agent can be used for enhancing the adhesive strength. Examples of the silane coupling agent include vinyltriethoxysilane, vinyltris(β-methoxyethoxy)silane, γ-methacryloxypropylmethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropylmethoxysilane, γ-aminopropyltriethoxysilane, N-β-(aminoethyl)-γ-aminopropyltrimethoxysilane. The silane coupling agent can be used singly, or in combination of two or more kinds. The silane coupling agent is preferably used in the range of 0.01 to 5 weight by part based on 100 parts by weight of the above reactive polymer.

Similarly, an epoxy group-containing compound can be used for enhancing the adhesive strength. Examples of the epoxy group-containing compounds include triglycidyl tris (2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol glycidyl ether, p-tert-butylphenyl glycidyl ether, diglycidyl adipate, diglycidyl o-phthalate, glycidyl methacrylate and butyl glycidyl ether. Further, the similar effect is also obtained by using an oligomer having an epoxy group and molecular weight of hundreds to thousands, or a polymer having an epoxy group and molecular weight of thousands to hundreds of thousands. The content of the compound having an epoxy group is sufficient in the range of 0.1 to 20 parts by weight based on 100 parts by weight of the reactive polymer, particularly 1 to 10% by weight. At least one of the compounds having an epoxy group can be used singly or in combination of two or more kinds.

As other additives, further a hydrocarbon resin can be used for improving processing properties such as laminating properties. The hydrocarbon resin may be either natural resin or synthetic resin. Examples of the natural resins preferably include rosins, rosin derivatives and terpene resins. Examples of the rosins include gum resins, tall oil resins, wood resins. Examples of the rosin derivatives include hydrogenated rosins, disproportionated rosins, polymerized rosins, esterificated rosins, metal salts of rosins. Examples of the terpene resins include α-pinene resins, β-pinene resins, and terpene phenol resins. Moreover, as the natural resin, dammar, copal, shellac can be used. Examples of the synthetic resins preferably include petroleum resins, phenol resins, and xylene resins. Examples of the petroleum resins include aliphatic petroleum resins, aromatic petroleum resins, cycoaliphatic petroleum resins, copolymer type petroleum resins, hydrogenated petroleum resins, pure monomer type petroleum resins, and coumarone-indene resins. Examples of the phenol resins include alkylphenol resins and modified phenol resins. Examples of the xylene resins include xylene resins and modified xylene resins.

Furthermore, acrylic resin can be employed in the invention. For example, homopolymers and copolymers obtained from alkyl acrylate(s) such as methyl acrylate, ethyl acrylate and butyl acrylate and/or alkyl methacrylate(s) such as methyl methacrylate, ethyl methacrylate and butyl methacrylate can be used. Copolymers of these monomers and other copolymerizable monomers can be also used. In view of reactivity in the photo curing step and durability and transparency of cured product, polymethyl methacrylate (PMMA) is preferred.

The above-mentioned polymer such as hydrocarbon resin can be used in the amount of 1 to 20 parts by weight, preferably 5 to 15 parts by weight based on 100 parts by weight of the reactive polymer.

The photo-curable composition may contain, in addition to the above-mentioned additives, ultraviolet absorber, aging resistant agent, dye, and processing auxiliary agent in a small amount. If desired, particles of silica gel, calcium carbonate or silicone copolymer may be contained in a small amount.

The photo-curable transfer sheet provided with the photo-curable layer comprising the photo-curable composition of the invention is generally prepared by homogeneously mixing the reactive polymer, a compound having a photopolymerizable functional group (monomer and oligomer) and if desired other additives, kneading the mixture using an extruder or roll, and subjecting the kneaded mixture to a film-forming process using a calendar, roll, T-die extrusion or inflation to form a film of a predetermined dimension. When a support is used, it is needed to form a film on the support. A more preferred process for forming the photo-curable transfer sheet comprises the steps of: dissolving homogeneously the components in a good solvent, applying the resultant solution onto a separator coated closely with silicone or fluoric resin (or the support) by means of flow-coater method, roll-coater method, gravure-roll method, mayer-bar method or lip-die coating method, and vaporizing the solvent.

The surface of the photo-curable transfer sheet may be embossed in the film formation process to prevent blocking and facilitate deaeration in the step depressing the sheet and the supporting substrate or stamper. As methods for the embossing processing, conventional methods such as a method using embossing roll can be adopted. In a process for applying a solution, it is possible that the solution is applied onto a embossed film or paper to transfer the emboss to the sheet. Mean surface roughness (Ra) of the embossed surface is generally not more than 50 μm, preferably 0.01 to 50 μm, especially 0.1 to 20 μm, whereby air is easily escaped from an interface between the sheet and a device to permit the embossed surface of the sheet to fill up complicated unevenness of the device. The mean surface roughness of less than 0.01 μm is apt to bring about poor deaeration, whereas the mean surface roughness of more than 50 μm is apt to allow the unevenness of the sheet to remain in the depressing step.

The thickness of the photo-curable layer generally is in the range of 1 to 1,000 μm, preferably 5 to 500 μm, especially 5 to 300 μm. When the thickness is thinner than 1 μm, sealing properties are lowered and maybe the sheet does not full up the unevenness of the transparent supporting substrate. When the thickness is thicker than 1,000 μm, the thickness of the resultant recording medium is so thick whereby trouble in housing or storing of the medium and the resultant assembly or reverse influence in light transmittance possibly occurs.

It preferred in the photo-curable transfer sheet preferably to provide the photo-curable layer on the support.

The support preferably comprises transparent organic resin having a glass transition temperature of not less than 50° C. The support generally is a transparent resin sheet mainly consisting of organic resin such as polyester resin (e.g., polyethylene terephthalate, polycyclohexylene terephthalate, polyethylene naphthalate), polyamide (e.g., nylon 46, modified nylon 6T, nylon MXD6, polyphthalamide), ketone resin (e.g., polyphenylene sulfide, polythioether sulfone), sulfone resin (e.g., polysulfone, polyether sulfone), polyether nitrile, polyarylate, polyether imide, polyamideimide, polycarbonate, polymethyl methacrylate, triacetylcellulose, polystyrene or polyvinyl chloride. Of these resins, polycarbonate, polymethyl methacrylate, polyvinyl chloride, polystyrene and polyethylene terephthalate are excellent in transfer properties and birefringence, and therefore can be preferably employed. Mean surface roughness (Ra) of the support is generally not more than 30 µm, especially mot more than 10 µm.

The photo-curable transfer sheet of the invention obtained as above generally comprises the photo-curable composition containing the reactive polymer of a glass transition temperature of not more than 20° C. Further, the photo-curable transfer sheet or cured the photo-curable transfer sheet (generally corresponding to optical information recording substrate) generally has a light transmittance of not less than 70% in a wavelength rang of 380 to 420 nm, preferably 380 to 800 nm. In more detail, by setting the glass transition temperature of the reactive polymer to not more than 20° C., the resultant photo-curable layer having flexibility can follow exactly the uneven surface of the stamper even at room temperature when the layer is depressed on the stamper. Especially, in the case of the glass transition temperature of 15 to −50° C., the properties following exactly the uneven surface of the stamper is further improved. When the glass transition temperature is so high, high pressure and temperature is needed for the depressin or bonding operation. When the glass transition temperature is so low, the resultant layer (sheet) after curing does not have sufficient hardness.

As described above, the (cured) photo-curable layer of the photo-curable transfer sheet generally has a light transmittance of not less than 70% in a wavelength rang of 380 to 420 nm, preferably 380 to 800 nm, whereby reduction of the strength of signals read out with a laser beam can be prevented. Further, the layer preferably has a light transmittance of not less than 80% in a wavelength rang of 380 to 420 nm, and also preferably has a light transmittance of not less than 80% in a wavelength rang of 390 to 410 nm.

The reactive polymer of the photo-curable composition preferably has 1 to 50% by mole of polymerizable functional group, whereby the cured reactive polymer has strength capable of holding its shape. The photopolymerization initiator is preferably used in the amount of 0.1 to 10% by weight as described previously. The amount of less than the lower limit causes workability to reduce owing to slow curing rate, whereas the amount of more than the upper limit causes the transferring precision to reduce.

The photo-curable transfer sheet of the invention can be offered as a film precisely controlled in the thickness, and therefore it is possible to easily and precisely bond the sheet to the stamper. This bonding (laminating) can be easily carried out by depressing the sheet and stamper by means of easy method using pressure rollers or easy press to temporarily bond them at temperature of 20 to 100° C., and then curing the sheet by exposing it to light at room temperature for one to tens seconds. Further, the temporarily bonded laminate is free from occurrence of slippage or peeling between of the layer and stamper owing to its specific adhesion, and hence the laminate can be freely handled until the light-curing step.

In case the photo-curable layer of the invention is cured, it is possible to adopt, as light source used, various sources generating light in the wavelength range of ultraviolet ray to visible ray. Examples of the sources include super-high-pressure, high-pressure and low-pressure mercury lamps, a chemical lamp, a xenon lamp, a mercury halogen lamp, a carbon arc lamp, and an incandescent electric lamp, and laser beam. The exposing time is generally a few seconds to a few minutes, depending upon kinds of the lamp and strength of light. To promote the curing, the laminate may be heated beforehand for 30 to 80° C., and then the heated laminate may be exposed to ultraviolet ray.

A metal reflective layer is formed on an uneven surface of the resultant cured photo-curable layer having the uneven surface by metallizing (e.g., spattering, vacuum deposition, ion-plating) to form an optical information recording substrate of the invention. Examples of the metal materials include aluminum, gold, silver or alloy thereof. When two optical information recording substrates are used, it is necessary that two reflective layers different from each other are formed by changing the materials and/or the thickness.

When two optical information recording substrates are used, the optical information recording substrate of the invention and a conventional substrate prepared by injection molding are generally employed. For example, the optical information recording medium of the invention can be prepared by facing the two reflective layers of two optical information recording substrates to each other, applying an adhesive to the reflective layer of one of the substrates, interposing the other substrate on the adhesive layer of the reflective layer and then curing the adhesive layer. When the adhesive is UV-curable resin, it is cured by UV irradiation, and when the adhesive is hot-melt type, it is applied to the reflective layer under heating and then cooled.

In the preparation of the optical information recording medium of the invention, it is continuously processed in the form of sheet and finally punched out in the form of disc. However, it may be processed in the form of disc, for example, in case processing under reduced pressure is required.

EXAMPLE

The invention is illustrated in detail using the following Examples.

Example 1

<Preparation of Photo-curable Transfer Sheet>

(Preparation of reactive polymer)

Formulation I

| | |
|---|---|
| 2-ethylhexyl methacrylate | 70 parts by weight |
| methyl methacrylate | 20 parts by weight |
| 2-hydroxyethyl methacrylate | 10 parts by weight |
| benzophenone | 5 parts by weight |
| toluene | 30 parts by weight |
| ethyl acetate | 30 parts by weight |

A mixture of the above Formulation I was heated to 60° C. with moderately stirring to initiate the polymerization, and stirred at this temperature for 10 hours to provide acrylic resin having a hydroxyl group on its side chain. Then, 5 parts by weight of Calens MOI (2-isocyanatoethyl methacrylate; available from Showa Denko K.K.) was added to the solution of the acrylic resin, and reacted with each other at 50° C. with moderately stirring to provide a solution 1 containing a reactive polymer having a photopolymerizable functional group.

The resultant reactive polymer has Tg of 0° C. and 5% by mole of methacryloyl group on its side.

Formulation II

| | |
|---|---|
| solution 1 of reactive polymer | 100 parts by weight |
| tricyclodecane diacrylate | 30 parts by weight |
| 1-hydroxycyclohexyl phenyl ketone | 1 part by weight |

An above Formulation II was homogeneously dissolved to give a mixture, which was applied onto a film of Pure Ace C110-70 (thickness: 70 µm; available from TEIJIN LTD.) and dried to form a photo-curable layer of thickness of 30±2 µm. Thus, a photo-curable transfer sheet of thickness of 100±2 µm was prepared.

<Preparation of One Optical Information Recording Substrate Having Reflective Layer>

The photo-curable transfer sheet was depressed on an unevenness surface of a stamper having the uneven surface as pits using a roller made of silicone rubber under load of 2 kg to form a laminate in which the shape of the uneven surface was transferred to a surface of the photo-curable transfer sheet.

Subsequently, the photo-curable transfer sheet of the laminate was exposed to UV-rays under the condition of an integrated amount of light of 2,000 mJ/cm$^2$ and as a result, the transferred layer (photo-curable layer) was cured. The stamper was peeled from the laminate. Silver alloy was spattered on the uneven surface of the cured photo-curable layer (optical information recording substrate) to form a semitransparent reflective layer of silver alloy. Thus, an optical information recording substrate having reflective layer was prepared.

<Preparation of the Other Optical Information Recording Substrate Having Reflective Layer>

Melt carbonate was poured into a mold having an uneven surface as pits and solidified to form an optical information recording substrate having thickness of 1,100 μm. Aluminum was spattered on the uneven surface of the optical information recording substrate to form a reflective layer of Al. Thus, the other optical information recording substrate having reflective layer was prepared.

<Preparation of Optical Information Recording Medium>

A commercially available photo-curable liquid adhesive (SD-661; available from DAINIPPON INK AND CHEMICALS, INC.) was applied onto one of the reflective layers of the optical information recording substrates by spin coating, and the two optical information recording substrates were superposed on each other such that the reflective layer were faced to each other, and then the adhesive was cured by light. Thus, an optical information recording medium was prepared.

Example 2

<Preparation of Photo-curable Transfer Sheet>

(Preparation of reactive polymer)

Formulation I'

| | |
|---|---|
| n-hexyl methacrylate | 50 parts by weight |
| 2-hydroxyethyl methacrylate | 50 parts by weight |
| benzophenone | 5 parts by weight |
| toluene | 30 parts by weight |
| ethyl acetate | 30 parts by weight |

A mixture of the above Formulation I' was heated to 60° C. with moderately stirring to initiate the polymerization, and stirred at this temperature for 10 hours to provide acrylic resin having a hydroxyl group on its side chain. Then, 50 parts by weight of Calens MOI (2-isocyanatoethyl methacrylate; available from Showa Denko K.K.) was added to the solution of the acrylic resin, and reacted with each other at 50° C. with moderately stirring to provide a solution 2 containing a reactive polymer having a photopolymerizable functional group.

The resultant reactive polymer has Tg of 5° C. and 50% by mole of methacryloyl group on its side.

Formulation II'

| | |
|---|---|
| solution 2 of reactive polymer | 100 parts by weight |
| 1,6-hexanediol dimethacrylate | 10 parts by weight |
| 1-hydroxycyclohexyl phenyl ketone | 1 part by weight |

An above Formulation II' was homogeneously dissolved to give a mixture, which was applied onto a film of Pure Ace C110-70 (thickness: 70 μm; available from TEIJIN LTD.) and dried to form a photo-curable layer of thickness of 30±2 μm. Thus, a photo-curable transfer sheet of thickness of 100±2 μm was prepared.

<Preparation of One and the Other Optical Information Recording Substrates Having Reflective Layer and Optical Information Recording Medium>

One and the other optical information recording substrates and optical information recording medium were prepared in the same manner as described in Example 1 except for using the resultant photo-curable transfer sheet. Thus DVD was obtained.

Comparison Example 1

An optical information recording medium was prepared in the same manner as described in Example 1 except for performing the preparation of one optical information recording substrate in the following manner:

<Preparation of One Optical Information Recording Substrate Having Reflective Layer>

Melt carbonate was poured into a mold having an uneven surface as pits and solidified to form an optical information recording substrate having thickness of 100±2 μm. Silver alloy was spattered on the uneven surface of the optical information recording substrate to form a semitransparent reflective layer of silver alloy. Thus, one optical information recording substrate having reflective layer was prepared.

<Evaluation of Optical Information Recording Substrate and Medium>

(1) Light transmittance (wavelength of 380 to 800 nm)

Light transmittance of one optical information recording substrate is measured in the wavelength of 380 to 800 nm according to JIS K6717. Light transmittance of 70% or more is marked as o, and Light transmittance of less than 70% is marked as x.

(2) Light transmittance (wavelength of 380 to 420 nm)

Light transmittance of one optical information recording substrate is measured wavelength of 380 to 420 nm according to JIS K6717. Light transmittance of 80% or more is marked as o, and Light transmittance of less than 80% is marked as x.

(3) Roughness of land portion

A land portion of an uneven surface on which pits were formed is evaluated on its smoothness using AFM (atomic force microscope). Land portion having sufficient smoothness is marked as o, and land portion having poor smoothness is marked as x.

(4) Readout of signals

The information of the resultant optical information recording medium is read out using a laser beam of wavelength of 405 nm to obtain its wavy pattern. This wavy pattern is compared with that of the stamper. The wavy pattern of the medium coincident with that of the stamper is marked as o, and the wavy pattern of the medium little coincident with that of the stamper is marked as x.

The obtained results are shown in Table 1.

TABLE 1

|  | Example 1 | Example 2 | Com. Example 1 |
|---|---|---|---|
| Light transmittance (380-800 nm) | ○ | ○ | ○ |
| Light transmittance (380-420 nm) | ○ | ○ | ○ |
| Roughness of land | ○ | ○ | X |
| Readout of signals | ○ | ○ | X |

Example 3

<Preparation of Photo-Curable Transfer Sheet>

(Preparation of reactive polymer)

Formulation I

| 2-ethylhexyl methacrylate | 70 parts by weight |
|---|---|
| methyl methacrylate | 20 parts by weight |
| 2-hydroxyethyl methacrylate | 10 parts by weight |
| benzophenone | 5 parts by weight |
| toluene | 30 parts by weight |
| ethyl acetate | 30 parts by weight |

A mixture of the above Formulation I was heated to 60° C. with moderately stirring to initiate the polymerization, and stirred at this temperature for 10 hours to provide acrylic resin having a hydroxyl group on its side chain. Then, 5 parts by weight of Calens MOI (2-isocyanatoethyl methacrylate; available from Showa Denko K.K.) was added to the solution of the acrylic resin, and reacted with each other at 50° C. with moderately stirring to provide a solution 1 containing a reactive polymer having a photopolymerizable functional group.

The resultant reactive polymer has Tg of 0° C. and 5% by mole of methacryloyl group on its side.

Formulation II

| solution 1 of reactive polymer | 100 parts by weight |
|---|---|
| tricyclodecane diacrylate | 30 parts by weight |
| 1-hydroxycyclohexyl phenyl ketone | 1 part by weight |

An above Formulation II was uniformly dissolved to give a mixture, which was applied onto a film of Pure Ace C110-70 (thickness: 70 μm; available from TEIJIN LTD.) and dried to form a photo-curable layer of thickness of 30±2 μm. Thus, a photo-curable transfer sheet of thickness of 100±2 μm was prepared.

<Preparation of One Optical Information Recording Substrates I to IV Having Reflective Layer>

The photo-curable transfer sheet was depressed on an unevenness surface of a stamper having the surface as pits using a roller made of silicone rubber under load of 2 kg to form a laminate in which the shape of the uneven surface was transferred to a surface of the photo-curable transfer sheet.

Subsequently, the photo-curable transfer sheet of the laminate was exposed to UV-rays of a metal-halide lamp under the condition of an integrated amount of light of 2,000 mJ/cm$^2$ and as a result, the transferred layer (photo-curable layer) was cured. The stamper was peeled from the laminate. Silver alloy was spattered on the uneven surface of the cured photo-curable layer (optical information recording substrate) to form a semitransparent reflective layer (thickness: 10 nm) of silver alloy. Thus, an optical information recording substrate I having reflective layer was prepared.

Optical information recording substrates II, III and IV were prepared as the same manner as the above substrate I except for forming a semitransparent reflective layer (thickness: 12 nm) of silver alloy in the substrate II, a semitransparent reflective layer (thickness: 14 nm) of silver alloy in the substrate III and a reflective layer (thickness: 18 nm) of aluminum in the substrate IV instead of the semitransparent reflective layer (thickness: 10 nm) of silver alloy. The optical information recording substrate I is directly provided on a transparent supporting substrate, whereas an optical information recording substrate IV is provided most away from the supporting substrate.

<Preparation of Optical Information Recording Medium>

Melt carbonate was poured into a mold having an uneven surface as pits and solidified to form the transparent supporting substrate having thickness of 800 μm. A commercially available photo-curable liquid adhesive (SD-661; available from DAINIPPON INK AND CHEMICALS, INC.) was applied onto the supporting substrate by spin coating, and the optical information recording substrate I was superposed on the adhesive layer, and then the adhesive was cured by light. Subsequently, the optical information recording substrates II, III and IV were superposed in this order on the surface having no reflecting layer of the optical information recording substrate I to be bonded by curing in the same manner as above. Thus, DVD was prepared.

Example 4

<Preparation of Photo-Curable Transfer Sheet>

(Preparation of reactive polymer)

Formulation I'

| n-hexyl methacrylate | 50 parts by weight |
|---|---|
| 2-hydroxyethyl methacrylate | 50 parts by weight |
| benzophenone | 5 parts by weight |
| toluene | 30 parts by weight |
| ethyl acetate | 30 parts by weight |

A mixture of the above Formulation I' was heated to 60° C. with moderately stirring to initiate the polymerization, and stirred at this temperature for 10 hours to provide acrylic resin having a hydroxyl group on its side chain. Then, 50 parts by weight of Carends MOI (2-isocyanatoethyl methacrylate; available from Showa Denko K.K.) was added to the solution of the acrylic resin, and reacted with each other at 50° C. with moderately stirring to provide a solution 2 containing a reactive polymer having a photopolymerizable functional group.

The resultant reactive polymer has Tg of 5° C. and 50% by mole of methacryloyl group on its side.

Formulation II'

| solution 2 of reactive polymer | 100 parts by weight |
|---|---|
| 1,6-hexanediol dimethacrylate | 10 parts by weight |
| 1-hydroxycyclohexyl phenyl ketone | 1 part by weight |

An above Formulation II' was uniformly dissolved to give a mixture, which was applied onto a film of Pure Ace C110-70 (thickness: 70 μm; available from TEIJIN LTD.) and dried to form a photo-curable layer of thickness of 30±2 μm. Thus, a photo-curable transfer sheet of thickness of 100±2 μm was prepared.

<Preparation of Optical Information Recording Medium>

DVD was obtained in the same manner in Example 3 except for using the above photo-curable transfer sheet.

<Evaluation of Optical Information Recording Substrate and Medium>

(1) Light transmittance (wavelength of 380 to 800 nm)

Light transmittance of one optical information recording substrate is measured in the wavelength of 380 to 800 nm according to JIS K6717. Light transmittance of 70% or more is marked as ○, and Light transmittance of less than 70% is marked as x.

(2) Light transmittance (wavelength of 380 to 420 nm)

Light transmittance of one optical information recording substrate is measured in the wavelength of 380 to 420 nm according to JIS K6717. Light transmittance of 80% or more is marked as ○, and Light transmittance of less than 80% is marked as x.

(3) Roughness of land portion

A land portion of a uneven surface on which pits were formed is evaluated on its smoothness using AFM (atomic force microscope). Land portion having sufficient smoothness is marked as ○, and land portion having poor smoothness is marked as x.

The obtained results are shown in Table 2.

TABLE 2

|  | Example 3 | Example 4 |
|---|---|---|
| Light transmittance (380-800 nm) | ○ | ○ |
| Light transmittance (380-420 nm) | ○ | ○ |
| Roughness of land | ○ | ○ |

As described above, the photo-curable transfer sheet of the invention permits an uneven shape of a stamper for preparing an optical information recording substrate to be precisely transferred to itself. Thus the resultant optical information recording substrate has a signal surface (uneven surface) to which an uneven shape of a stamper is precisely transferred. Accordingly, an optical information recording medium prepared from the recoding substrate scarcely brings about occurrence of error when the information (signals) is read out.

Further, the optical information recording substrate of the invention is obtained by deforming the photo-curable transfer sheet by melting and curing it to form an uneven surface, and therefore even the optical information recording substrate having a thickness of 300 μm or less can be prepared by the transferring through melting. Furthermore, the photo-curable transfer sheet of the invention has excellent dimension stability and does not suffer from deformation such as warpage due to less cure shrinkage than a conventional UV-curable resin.

Moreover, the optical information recording substrate of the invention obtained using the photo-curable transfer sheet has a signal surface to which the uneven surface of the stamper is precisely transferred, even if it has a small thickness. Hence, a multi-layered optical information recording substrate prepared by a number of substrates mentioned above is suppressed with respect to increase of the thickness, and each layer (photo-curable layer) has a precisely transferred signal surface and therefore can be read out without little error.

[Description of Reference Number]

| 10, 50: | Photo-curable transfer sheet |
| 11: | Photo-curable layer |
| 12: | Support |
| 13: | Silver alloy reflective layer |
| 20, 30, 60: | Optical information recording substrate |
| 40, 70, 78: | Optical information recording medium |
| 21: | Stamper |
| 33, 74: | Al reflective layer |
| 34, 77, 79: | Adhesive layer |
| 75: | Optical information recording substrate having reflective layer |
| 76: | Transparent supporting substrate |
| 1, 2: | Transparent resin substrate |
| 1a, 2a: | Reflective layer |
| 3: | Adhesive layer |
| 1b: | Semitransparent layer |

The invention claimed is:

1. A laminate comprising a stamper having an uneven surface of recorded pits and/or grooves and a photo-curable transfer sheet having a photo-curable layer comprising a photo-curable composition, the photo-curable composition being deformable by application of pressure and containing a reactive polymer having a photopolymerizable functional group, and further the photo-curable composition having a glass transition temperature of not more than 20° C., wherein the photo-curable layer of the photo-curable transfer sheet is provided closely on the uneven surface, and wherein the reactive polymer comprises a homopolymer or copolymer derived from alkyl acrylate and/or alkyl methacrylate.

2. The laminate as defined in claim 1, wherein the photo-curable transfer sheet has a light transmittance of not less than 70% in a wavelength range of 380 to 420 nm.

3. The laminate as defined in claim 1, wherein the photo-curable transfer sheet has a light transmittance of not less than 70% in a wavelength range of 380 to 800 nm.

4. The laminate as defined in claim 1, wherein the reactive polymer has 1 to 50% by mole of the photopolymerizable functional group.

5. The laminate as defined in claim 4, wherein the photopolymerizable functional group is a (meth)acryloyl group.

6. The laminate as defined in claim 1, wherein the photo-curable composition contains 0.1 to 10% by weight of a photopolymerization initiator.

7. The laminate as defined in claim 1, wherein the photo-curable layer has a thickness of 5 to 300 μm.

8. The laminate as defined in claim 1, wherein the photo-curable layer is provided on a support having a thickness of 30 to 300 μm.

9. The laminate as defined in claim 1, wherein the photo-curable layer has cure shrinkage of not more than 8%.

10. The laminate as defined in claim 1, wherein the reactive polymer has number-average molecular weight of 5,000 to 1,000,000.

11. The laminate as defined in claim 1, wherein the photo-curable layer is the photo-curable transfer sheet.

12. An optical information recording substrate having an uneven surface of recorded pits and/or grooves, wherein a layer containing at least the uneven surface of the substrate is formed by curing a photo-curable layer comprising a photo-curable composition, the photo-curable composition being deformable by application of pressure and containing a reactive polymer having a photopolymerizable functional group, and further the photo-curable composition having a glass transition temperature of not more than 20° C., and wherein the reactive polymer comprises a homopolymer or copolymer derived from alkyl acrylate and/or alkyl methacrylate.

13. The optical information recording substrate as defined in claim 12, wherein the cured photo-curable layer is provided on a support.

14. The optical information recording substrate as defined in claim 12, wherein the reactive polymer has number-average molecular weight of 5,000 to 1,000,000.

15. An optical information recording medium comprising an optical information recording substrate having an uneven surface of recorded pits and/or grooves and a reflective layer formed on the uneven surface, and another optical information recording substrate having an uneven surface of recorded pits and/or grooves and a semitransparent reflective layer formed on the uneven surface, both the substrates being bonded to each other through an adhesive layer such that both the reflective layers are faced to each other, wherein a layer containing at least the uneven surface of at least one of the substrates is formed by curing a photo-curable layer comprising a photo-curable composition, the photo-curable composition being deformable by application of pressure and containing a reactive polymer having a photopolymerizable functional group, and further the photo-curable composition having a glass transition temperature of not more than 20° C., and wherein the reactive polymer comprises a homopolymer or copolymer derived from alkyl acrylate and/or alkyl methacrylate.

16. The optical information recording medium as defined in claim 15, wherein the reactive polymer has number-average molecular weight of 5,000 to 1,000,000.

17. An optical information recording medium comprising an optical information recording substrate having an uneven surface of recorded pits and/or grooves and a reflective layer formed on the uneven surface, and another optical information recording substrate having an uneven surface of recorded pits and/or grooves and a semitransparent reflective layer formed on the uneven surface, both the substrates being bonded to each other through an adhesive layer such that the reflective layer of the former substrate faces the surface having no reflective layer of the latter substrate, wherein a layer containing at least the uneven surface of at least one of the substrates is formed by curing a photo-curable layer comprising a photo-curable composition, the photo-curable composition being deformable by application of pressure and containing a reactive polymer having a photopolymerizable functional group, and further the photo-curable composition having a glass transition temperature of not more than 20° C., and wherein the reactive polymer comprises a homopolymer or copolymer derived from alkyl acrylate and/or alkyl methacrylate.

18. An optical information recording medium comprising an transparent substrate and the optical information recording medium as defined in claim 17 bonded to the transparent substrate through an adhesive layer such that the reflective layer faces the transparent substrate.

19. The optical information recording medium as defined in claim 17, wherein the reactive polymer has number-average molecular weight of 5,000 to 1,000,000.

20. An optical information recording medium comprising a transparent supporting substrate and three or more optical information recording substrates having an uneven surface of recorded pits and/or grooves and a reflective layer formed on the uneven surface, all the optical information recording substrates being bonded to the transparent supporting substrate in order through an adhesive layer such that the reflective layer faces the surface of the transparent supporting substrate or the surface having no reflective layer of the optical information recording substrates, wherein a layer containing at least the uneven surface of at least one of the optical information recording substrates being formed by curing a photo-curable layer comprising a photo-curable composition, the photo-curable composition being deformable by application of pressure and containing a reactive polymer having a photo-polymerizable functional group, and further the photo-curable composition having a glass transition temperature of not more than 20° C., and wherein the reactive polymer comprises a homopolymer or copolymer derived from alkyl acrylate and/or alkyl methacrylate.

21. The optical information recording medium as defined in claim 20, wherein the surface of the transparent supporting substrate facing to the adhesive layer has an unevenness of recorded pits and a reflective layer formed on the uneven surface.

22. The optical information recording medium as defined in claim 20, wherein the reactive polymer has number-average molecular weight of 5,000 to 1,000,000.

* * * * *